(12) United States Patent
Bölter et al.

(10) Patent No.: US 11,102,031 B2
(45) Date of Patent: Aug. 24, 2021

(54) FLEXIBLE DATA RATE HANDLING IN DATA BUS RECEIVER

(71) Applicant: Melexis Technologies NV, Tessenderlo (BE)

(72) Inventors: Martin Bölter, Erfurt (DE); Thomas Freitag, Plaue (DE); Jörgen Sturm, Weimar (DE); Anton Babushkin, Kiev (UA)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 219 days.

(21) Appl. No.: 16/423,806

(22) Filed: May 28, 2019

(65) Prior Publication Data

US 2019/0372803 A1 Dec. 5, 2019

(30) Foreign Application Priority Data

May 31, 2018 (EP) ..................................... 18175426

(51) Int. Cl.
*G08C 17/00* (2006.01)
*H04L 12/40* (2006.01)
*H04L 12/12* (2006.01)

(52) U.S. Cl.
CPC ........ *H04L 12/40039* (2013.01); *H04L 12/12* (2013.01); *H04L 12/40169* (2013.01); *H04L 2012/40215* (2013.01)

(58) Field of Classification Search
USPC .... 370/229, 230, 230.1, 231, 235, 252, 257, 370/290, 311, 358, 359, 362, 366, 389,
(Continued)

(56) References Cited

U.S. PATENT DOCUMENTS

2016/0094312 A1    3/2016  Fredriksson et al.
2016/0283432 A1*   9/2016  Marinho ............. G06F 11/1443
(Continued)

FOREIGN PATENT DOCUMENTS

EP      3404873 A1    11/2018
WO   2015044705 A1     4/2015
WO   2017056855 A1     4/2017

OTHER PUBLICATIONS

Extended European Search Report from EP Application No. 18175426.8, dated Oct. 22, 2018.

*Primary Examiner* — Nguyen H Ngo
(74) *Attorney, Agent, or Firm* — Workman Nydegger

(57) ABSTRACT

The present invention relates to a receiver circuit for processing an incoming bit stream from a bus system. The circuit comprises an analog interface for converting the analog signal to a digital input data stream. The interface comprises an analog filter and a switch to process the analog signal before generating the digital input data stream using the filter if, and only if, a selection criterion controlling the switch is met. The circuit comprises a frame decoding unit for decoding a data frame encoded in the digital input data stream in accordance with a CAN protocol, and a frame processing unit that comprises a flexible data rate detector and a recessive bit counter for counting consecutive recessive bits after detecting the flexible data rate frame. The selection criterion is satisfied when the flexible data rate frame is detected and unsatisfied when the recessive bit counter reaches a predetermined number.

10 Claims, 4 Drawing Sheets

(58) Field of Classification Search
USPC .................................. 370/391, 451, 474, 476
See application file for complete search history.

(56) References Cited

U.S. PATENT DOCUMENTS

| | | | |
|---|---|---|---|
| 2016/0286010 A1* | 9/2016 | Lennartsson | ........... H04L 69/10 |
| 2017/0093908 A1* | 3/2017 | Elend | ................ H04L 12/40045 |
| 2017/0192920 A1* | 7/2017 | Thiele | ................. G06F 13/4068 |
| 2018/0113836 A1* | 4/2018 | Hirata | ..................... H04L 69/40 |
| 2018/0191488 A1 | 7/2018 | Matsudaira | |

\* cited by examiner

Fig. 5

FLEXIBLE DATA RATE HANDLING IN DATA BUS RECEIVER

FIELD OF THE INVENTION

The invention relates to the field of electronic data communication bus systems, e.g. to controller area network (CAN) buses. More specifically it relates to a receiver circuit for receiving data through an electronic data communication bus system, e.g. over a CAN bus, an integrated circuit device for transmitting and/or receiving data through an electronic data communication bus system, e.g. over a CAN bus, and related methods.

BACKGROUND OF THE INVENTION

In devices adapted for transmitting and/or receiving information via a digital data communication bus system, it can be advantageous to reduce power consumption. For example, it is known to provide a low-power bus monitoring mode of operation, in which the device conservatively consumes power to monitor incoming data transmitted over the data bus to detect a signal or message intended to instruct the device to resume a normal mode of operation.

For example, it is known in the art of Control Area Networks (CAN), e.g. in accordance with the standard ISO11898-6, to provide a selective wake-up functionality. This may advantageously allow a reduction of power consumption in such network. For example, a node on a CAN bus system in a vehicle may not be needed a large fraction, e.g. 80%, or even higher, e.g. 90% or 95%, of the time. While a node without selective wake-up capabilities might consume, for example, a few watts of power, e.g. 2 W, when waiting for a request, a node or group of nodes can be maintained in the selective wake-up state without wasting power in a CAN network that supports partial networking, as known in the art. Thus, power consumption can be severely reduced during an idle mode of a node when the node does not need to be active.

Partial networking enables a node or group of nodes to be woken separately from other nodes connected to the bus system. A wake-up signal may be transmitted in the form of a predetermined CAN message, e.g. as opposed to a generic wake-up in response to any bus activity, such as defined by the standard ISO11898-5. However, the CAN transceiver device may thus be required to monitor and analyze a bit stream transmitted via the bus for specific wake-up messages under severe power limitations, e.g. since only limited power consumption is allowed during its inactive state. For this, the receiver needs to be able to properly sample the incoming data bit stream, while, for example, clock accuracy in this inactive mode can be limited due to the power requirements.

However, even in a normal state, e.g. distinct from such a power-saving mode, it may still be advantageous to reduce power consumption.

Furthermore, the standard ISO11898-7 introduced CAN devices with flexible data rate (FD). Therefore, CAN devices would preferably be suitable for mixed FD and non-FD networks, for example by handling FD messages appropriately during selective wake-up bit streamprocessing. If a CAN device does not provide appropriate FD handling capabilities, receiving a CAN FD frame may result in an error detection, and possibly in an error counter overflow. Furthermore, a CAN receiver in a PN network may initiate an unnecessary wakeup when receiving a FD frame, due to the error detection, thus disadvantageously increasing the power consumption.

For example, WO 2015/044705 discloses a method for detecting an end-of-frame of a CAN FD frame in an input bit stream, e.g. to enable ignoring received FD frames while properly detecting frames received before or after the FD frame. The method comprises: providing a recessive bit count, defining a stretched bit transmission time longer than the bit transmission time associated with the high data rate, stretching the bit transmission time of each dominant bit succeeding a recessive bit in the input bit stream to the stretched bit transmission time to generate a conditioned input bit stream, sampling the conditioned input bit stream at a bit counter rate to generate a sampled bit stream, resetting the recessive bit count in response to each dominant bit in the sampled bit stream and incrementing the recessive bit count in response to each recessive bit in the sampled bit stream.

SUMMARY OF THE INVENTION

It is an object of embodiments of the present invention to provide simple, good and/or efficient means and methods to handle flexible data rate (FD) messages, e.g. in a power-efficient manner.

It is an advantage of embodiments of the present invention that low-power processing can be provided of a bit stream transmitted through an electronic data communication bus system, e.g. a Controller Area Network, e.g. in an integrated circuit that implements an Electronic Control Unit for receiving and/or transmitting data on a CAN bus, e.g. in a CAN transceiver.

It is an advantage of embodiments of the present invention that the end of a flexible data rate frame, e.g. at a high baud rate, can be efficiently detected in a receiver for a controlled area network (CAN).

It is an advantage of embodiments of the present invention that the end of a flexible data rate frame can be efficiently detected by a CAN receiver that supports partial networking (PN), e.g. a CAN receiver suitable for a mixed non-FD/FD CAN network that uses partial networking and flexible data-rate.

It is an advantage of embodiments of the present invention that the end of an FD frame can be detected by low-power bit stream processing.

It is an advantage of embodiments of the present invention that the end of an FD frame can be detected by a CAN receiver using a low-power, low-precision and/or low-cost RC oscillator, e.g. an RC oscillator suitable for selective wakeup functionality.

It is an advantage of embodiments of the present invention that power efficient and accurate CAN data bit stream processing can be provided that is suitable for CAN partial networking in a low-power mode, e.g. using a power efficient clock source having a limited precision, e.g. a low precision.

It is an advantage of embodiments of the present invention that, with limited power consumption and/or limited clock accuracy, CAN frames can be analyzed at the arbitration bit-rate by efficiently ignoring FD frames, e.g. analyzing the frames for the occurrence of a Wake Up Frame.

It is an advantage of embodiments of the present invention that a complete wake-up of a CAN transceiver, and/or a connected microcontroller, in low-power mode can be avoided upon receiving a flexible data rate frame.

It is an advantage of embodiments of the present invention that detecting a proper FD frame as erroneous is avoided, or at least the probability of such false error detection is reduced, even when in a low-power state.

It is an advantage of embodiments of the present invention that a simple and efficient method and/or means is provided to detect an end-of-frame of a CAN FD frame in an input bit stream.

It is an advantage of embodiments of the present invention that bit stream synchronization can be provided to enable accurate data sampling of the bit stream in a low power consumption mode of the device, e.g. of a CAN node.

Where reference is made to a low power consumption mode or low-power mode, this may refer to a power saving mode of operation of the device that is characterised by a substantially lower power consumption than a normal, or active, mode of operation, e.g. characterized by a passive mode of operation, in which the device processes an incoming data bit stream only to detect a predetermined wake-up message, e.g. a predetermined wake-up message specifically assigned to that node or a cluster of nodes, e.g. a subnetwork, to which the node is assigned. For example, this may particularly refer to a low power mode pursuant the standard ISO11898-6.

It is an advantage of embodiments of the present invention that a low-cost RC oscillator can be used in a method or device in accordance with embodiments of the present invention for precise and low-power bit stream sampling.

It is an advantage of embodiments of the present invention that a CAN node can be provided that has only a few components that require a high frequency clock.

It is an advantage of embodiments of the present invention that a high precision oscillator, e.g. a crystal oscillator (XTAL), and/or a high-speed high-precision clock signal, e.g. generated by a PLL, is not required for providing a fixed clock reference signal, e.g. at least when operating in a low power mode.

The above objective is accomplished by a method and device according to the present invention.

In a first aspect, the present invention relates to a receiver circuit for receiving an analog signal, encoding an incoming bit stream, from an electronic communication bus system and for processing said incoming bit stream. The receiver circuit comprises an analog interface for converting said analog signal to a digital input data stream, said analog interface comprising an analog filter and a switch to process said analog signal before generating said digital input data stream using said filter if, and only if, a selection criterion controlling said switch is met. The receiver circuit comprises a frame decoding unit for decoding a data frame encoded in said digital input data stream in accordance with a Controller Area Network protocol. The receiver circuit comprises a frame processing unit that comprises a flexible data rate detector for detecting a flexible data rate frame in said digital input data stream and a recessive bit counter for counting a number of consecutive recessive bits in said digital input data stream after detecting said flexible data rate frame. The frame processing unit is adapted for controlling said selection criterion, such that said selection criterion is satisfied when the flexible data rate frame is detected and is reset to an unsatisfied condition when the recessive bit counter reaches a predetermined number.

In a receiver circuit in accordance with embodiments of the present invention, the flexible data rate detector may be adapted for detecting a Flexible Data Rate Format (FDF) bit and for activating said analog filter by said switch upon detecting said FDF bit having a logic 1 value.

A receiver circuit in accordance with embodiments of the present invention may comprise a wake-up decision unit (7) for processing said data frame when said FDF bit is set to a logic 0 value such as to detect a selective wake-up message encoded in said data frame while the receiver circuit is in a power-preservation mode.

In a receiver circuit in accordance with embodiments of the present invention, said predetermined number may be six, corresponding to the detection of a BUS-IDLE state of six consecutive recessive bits.

A receiver circuit in accordance with embodiments of the present invention may comprise an edge detector and/or an edge validation unit, wherein said recessive bit counter receives an edge signal from said edge detector and/or said edge validation unit and is adapted for resetting its count when said edge signal indicates a falling edge.

In a receiver circuit in accordance with embodiments of the present invention, said analog filter may be a low-pass filter for filtering out frequencies in the analog signal that correspond to a time period shorter than a value in the range of 5% to 17.5% of the length of the nominal bit time of the incoming bitstream.

A receiver circuit in accordance with embodiments of the present invention may comprise a bit stream processing unit for bit stream synchronization and bit sampling of said digital input data stream to provide a sampled output signal, wherein said frame decoding unit is adapted for decoding a data frame in said sampled output signal.

A receiver circuit in accordance with embodiments of the present invention may comprise an RC oscillator for providing a timing signal to said bit stream processing unit and/or said frame decoding unit.

In a second aspect, the present invention relates to an integrated circuit device for transmitting and/or receiving data through an electronic communication bus system, the device comprising a transceiver. The transceiver comprises a bus system connector for interfacing with the electronic communication bus system and a receiver circuit in accordance with embodiments of the present invention for processing incoming data obtained from the electronic communication bus system via the bus system connector.

An integrated circuit device in accordance with embodiments of the present invention may be a Controller Area Network node for transmitting and/or receiving data through the electronic communication bus system, e.g. a Controller Area Network bus system.

An integrated circuit device in accordance with embodiments of the present invention may be adapted for supporting selective wake-up and/or partial networking of the Controller Area Network bus system.

In a third aspect, the present invention relates to a method for processing an incoming bit stream, encoded in an analog signal received from an electronic communication bus system. The method comprises converting said analog signal to a digital input data stream, wherein said analog signal is filtered, using an analog filter, before generating said digital input data stream if, and only if, a selection criterion is met. The method comprises at least partially decoding a data frame encoded in said digital input stream in accordance with a Controller Area Network protocol to detect a flexible data rate frame in said digital input data stream. The method comprises counting a number of consecutive recessive bits in said digital input data stream after detecting said flexible data rate frame. The method comprises controlling said selection criterion to be satisfied when the flexible data rate frame is detected and to be reset to an unsatisfied condition when said recessive bit count reaches a predetermined number.

In a method in accordance with embodiments of the present invention, said at least partially decoding said data frame may comprise detecting said flexible data rate frame by detecting a Flexible Data Rate Format (FDF) bit. Said controlling may comprise activating said analog filter upon detecting said FDF bit having a logic 1 value.

A method in accordance with embodiments of the present invention may comprise processing said data frame when said FDF bit is set to a logic 0 value such as to detect a selective wake-up message encoded in said data frame while the receiver circuit is in a power-preservation mode.

In a method in accordance with embodiments of the present invention, said predetermined number may be six, corresponding to the detection of a BUS-IDLE state of six consecutive recessive bits.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 5 illustrates data frame formats, as known in the art, for illustrating embodiments of the present invention.

Figure 1:
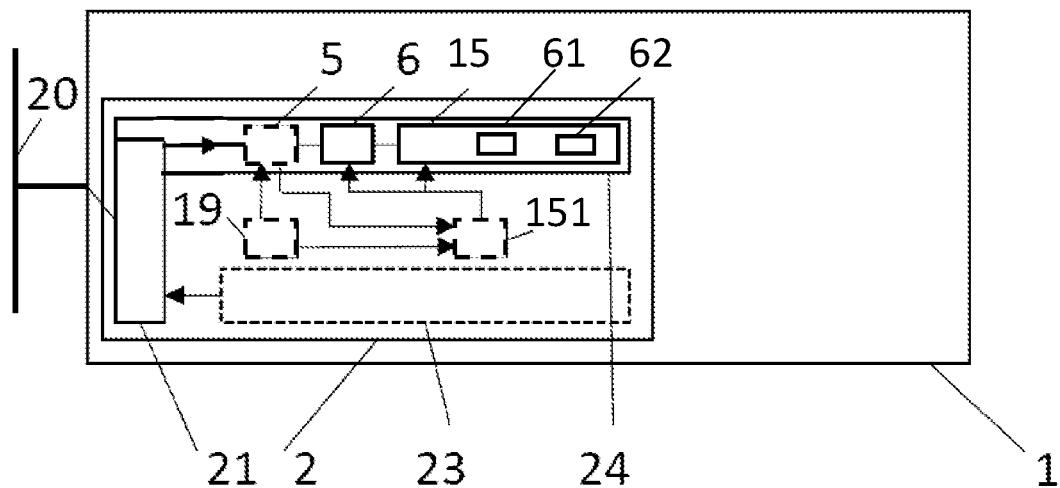
FIG. 1 illustrates a receiver circuit in accordance with embodiments of the present invention and an integrated circuit device in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a receiver circuit for receiving an analog signal, encoding an incoming bit stream, from an electronic communication bus system and for processing the incoming bit stream. The receiver circuit comprises an analog interface for converting the analog signal to a digital input data stream, the analog interface comprising an analog filter and a switch to process the analog signal before generating the digital input data stream using the filter if, and only if, a selection criterion controlling the switch is met. The receiver circuit comprises a frame decoding unit for decoding a data frame encoded in the digital input data stream in accordance with a Controller Area Network protocol. The receiver circuit comprises a frame processing unit that comprises a flexible data rate detector for detecting a flexible data rate frame in the digital input data stream and a recessive bit counter for counting a number of consecutive recessive bits, e.g. for determining the length of a sequence of consecutive recessive bits that is not interrupted by any intermediate dominant bits, in the digital input data stream after detecting the flexible data rate frame. The frame processing unit is adapted for controlling the selection criterion of the switch, such that the selection criterion is satisfied when the flexible data rate frame is detected and is reset to an unsatisfied condition when the recessive bit counter reaches a predetermined number.

Features of a device and/or a method in accordance with embodiments of the present invention may correspond to features of a receiver circuit, an integrated circuit device and/or a method as described in the presently pending European patent application EP3404873 A1, the contents of which are hereby incorporated by reference. Particularly, a receiver circuit 24 in accordance with embodiments of the present invention may comprise a receiver circuit as described in the aforementioned patent application. Features designated by corresponding terms in the present disclosure and the aforementioned patent application may be clearly identified as corresponding features and may implicitly belong to the present description as features of embodiments of the present invention.

Referring to FIG. 1, a receiver circuit 24 in accordance with embodiments of the present invention is shown. The receiver circuit 24 (e.g. an integrated circuit implementing a receiver) is adapted for receiving an analog signal, encoding an incoming bit stream, from an electronic communication bus system 20, i.e. a Controller Area Network bus, and for processing the incoming bit stream.

For example, the electronic communication bus system 20 may comprise at least one signal carrying conductor, e.g. at least one wire. For example, the electronic communication bus system may be a Controller Area Network (CAN) bus system, e.g. comprising a pair of bus data signal carrying conductors CANL, CANH.

The receiver circuit 24 may be adapted for supporting selective wake up (e.g. selective wake up according to the standard ISO/DIS 11898-6) and/or partial networking functionality in accordance with a Controller Area Network protocol. The receiver circuit 24 may be adapted for detecting a start of a high baud rate portion of a flexible data rate frame and for detecting an end of the flexible data rate (FD) frame, e.g. while supporting a partial networking (PN) controlled area network (CAN) and under the use of a low-power bit stream processing to support selective wakeup functionality.

The receiver circuit comprises an analog interface 21, e.g. a front-end analog bus interface, for converting the analog signal to a digital input data stream.

Figure 2:
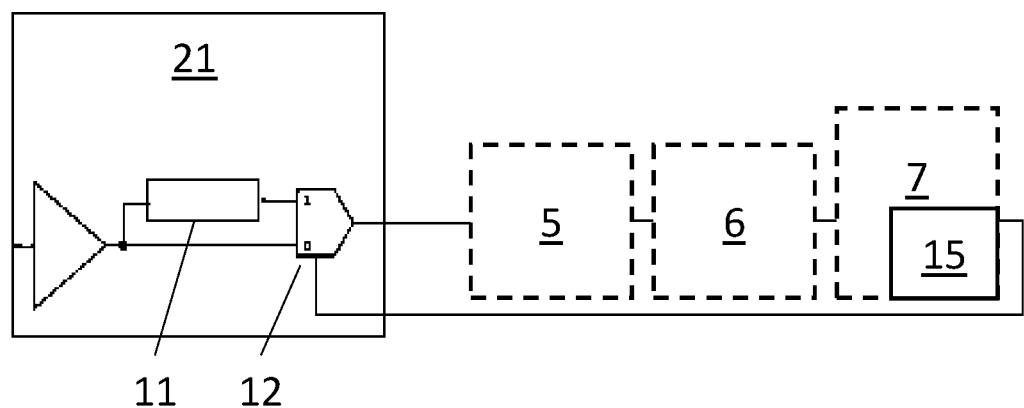
FIG. 2 shows details of a receiver circuit in accordance with embodiments of the present invention.

Referring to FIG. 2, the analog interface 21 comprises an analog filter 11 and a switch 12 to process the analog signal before generating the digital input data stream using the filter if, and only if, a selection criterion controlling the switch is met.

The selection criterion is controlled by the frame processing unit 15, e.g. the switch 12 receives a control signal from the frame processing unit 15, to use the analog filter 11, e.g. to incorporate an analog filter path in the receiver chain, starting from the detection of the FD frame, e.g. starting from the detection of a Flexible Data Rate Format (FDF) bit, e.g. by the frame processing unit 15 and during the receipt of the remaining data of the flexible data rate frame. The analog filter and switch may advantageously consume little power, e.g. as compared to different approaches of handling the receipt of FD frame data known in the art.

Filtering by the analog filter 11 is disabled, e.g. an unfiltered path is used in the receiver chain, during the receipt of the data of a non-FD frame and during the receipt of a flexible data rate frame up to the detection of the FD frame, e.g. up to the detection of a Flexible Data Rate Format (FDF) bit, e.g. by the frame processing unit 15, e.g. by the wake-up decision unit 7.

For example, the analog filter may be activated upon detecting the FD frame, e.g. detecting an FDF bit that is set to 1, and deactivated when a BUS Idle condition is detected, e.g. by the recessive bit counter 61 reaching a predetermined count, as explained further hereinbelow.

The analog filter 11 may be a low-pass filter. For example, the analog filter may be adapted for filtering out frequencies in the analog signal that correspond to a time period shorter than a value in the range of 2% to 17.5%, preferably in the range of 5% to 17.5%, such as in the range of 5% to 15%, of the length of the nominal bit time of the incoming bitstream. For example, for an arbitration bit rate of 500 kb/s, the nominal bit time may be 2 µs. Thus, the low pass filter may for example have a filter time constant of about 10% of this nominal bit time, e.g. 0.2 µs, e.g. corresponding to a 5 MHz filter frequency.

For example, glitches shorter than at least 5% of the length of the nominal bit time may be removed from the digital input data stream by the analog filter 11, when in an activate state as determined by the switch 12. Thus, advantageously, a reset of the recessive bit counter 61 may be avoided while counting a sequence of a predetermined number of consecutive recessive bits, e.g. six recessive bits. As explained further hereinbelow, recessive bit counter may be adapted for resetting at detecting a dominant sample in the incoming bitstream, e.g. transmitted at high speed. However, short glitches which could reset the counter in the sequence of recessive bits signalling an End-Of-Frame can advantageously be filtered out by the analog filter.

However, glitches longer than at most 17.5% of the length of the nominal bit time may be transmitted into the digital data stream by the analog filter 11, when in an activate state as determined by the switch 12. Thus, advantageously, the recessive bit counter 61 may still detect recessive-dominant-recessive patterns in the incoming data stream, e.g. transmitted at high speed, during passive error frames that interrupt the FD data phase. Thus, the counter can be reset by the REC-DOM-REC pattern in a data phase of the FD frame, e.g. while the analog filter is active, to accurately determine, e.g. by a counter overflow, the position in the stream for ending the filtering state by resetting the selection criterion to an inactive state for the filter.

Figure 4:
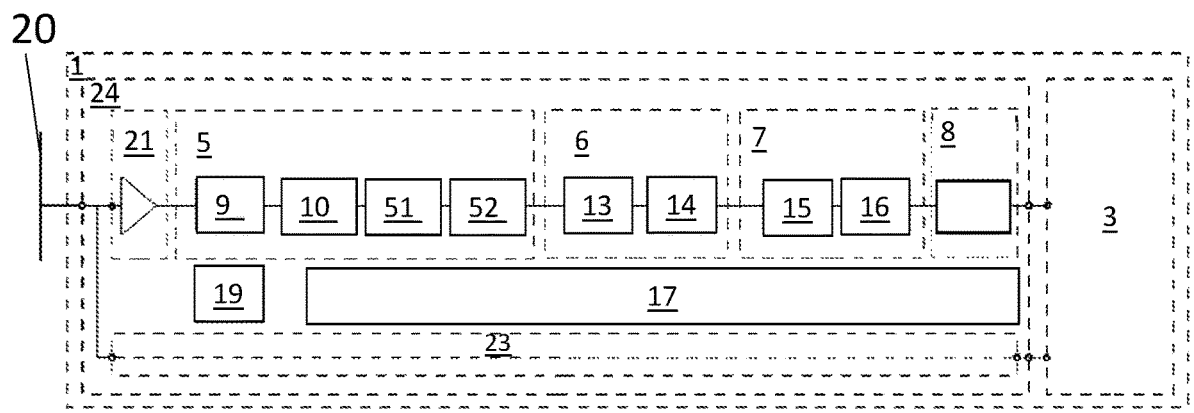
FIG. 4 illustrates a receiver circuit in accordance with embodiments of the present invention and an integrated circuit device in accordance with embodiments of the present invention.

Referring to FIG. 4, the receiver circuit 24 comprises a frame decoding unit 6. The receiver circuit may also comprise a bit stream processing unit 5 and/or a wake-up decision unit 7. The receiver 24 may comprise an interface module 8 for forwarding decoded frame information and/or sampled bit stream information to a microcontroller (or an external processor) 3 for handling the CAN protocol. Furthermore, the receiver circuit 24 may be comprised in a transceiver circuit 2, comprising, in addition to the component of a receive path as described herein, a transmit path 23 for sending data from the microcontroller (or external processor) 3 via the bus system 20.

The frame decoding unit 6 may comprise a de-stuffing unit 13 and a frame decoder 14. Such frame decoding units are known in the art, e.g. for decoding a data frame, e.g. encoded in the bit stream transferred from the bit sampling unit 52 via the sampled output signal. The frame decoding unit 6 may be adapted for decoding a CAN frame.

The wake-up decision unit 7 may comprise the frame processing unit 15 for processing data frame information provided by the frame decoding unit 6. The wake-up decision unit 7 may be adapted for detecting a selective wake-up message specifically targeted at the device, or at a cluster of devices the device is a member of, e.g. a selective wake-up message in accordance with a CAN protocol standard, and generating a wake-up signal in response to such message. Furthermore, the wake-up decision unit 7, e.g. the frame processing unit 15 in the wake-up decision unit, may also activate and deactivate the analog filter in the signal process chain. The wake-up decision unit 7 may comprise a wake-up signal output 16, e.g. to be provided via an interface 8 to a microcontroller (or an external processor) 3 for handling the CAN protocol.

The receiver circuit 24 may also comprise a clock signal generator 19, e.g. a low-power and/or low-precision oscillator, to provide a timing signal, e.g. a clock signal, for the receive path and/or other supporting units 17.

The clock signal generator 19 may be adapted for generating a first clock signal and for supplying the first clock signal to a bit stream processing unit 5 such that the bit stream processing unit operates at the frequency of the first clock signal.

The receiver circuit may also comprise a clock signal downsampler 151 for generating a second clock signal having a lower frequency than the first clock signal, in which the second clock signal is generated based on a co-occurrence of a clock pulse in the first clock signal and the emission of a bit in the sampled output signal provided by the bit stream processing unit 5. The second clock signal may be supplied to the frame decoding unit 6, such that the frame decoding unit operates at the frequency of the second clock signal.

The bit stream processing unit 5 may be adapted for synchronizing the first clock signal to an external protocol timing of the incoming bit stream. The clock signal downsampler 151 may generate the second clock signal as having a frequency corresponding to a baud rate frequency of the processed data stream.

The clock signal generator 19 may comprise an oscillator, e.g. may comprise a low precision oscillator, e.g. a low-power oscillator having a low precision. The oscillator may have a precision in the range of 1% to 20%, e.g. in the range of 2% to 10%, e.g. about 7.5% or about 5%. The oscillator may have an oscillation frequency in the range of 100 kHz to 64 MHz, e.g. in the range of 1 MHz to 32 MHz, e.g. in the range of 2 MHz to 16 MHz, e.g. in the range of 4 MHz to 8 MHz, e.g. 8 MHz. The clock signal generator 19 may comprise an analog electronic circuit. The clock signal generator may comprise an RC oscillator, e.g. a trimmable RC oscillator.

The receiver circuit 24 may comprise a bit stream processing unit 5 adapted for bit stream synchronization and bit sampling of an incoming bit stream received via the electronic communication bus system 20, e.g. digital input data provided by the analog front-end bus interface. Thus, the bit stream processing unit 5 may be adapted for synchronizing the first clock signal generated by the clock signal generator 19 to the external protocol timing of the incoming bit stream received via the electronic communication bus system 20. The bit stream processing unit 5 may furthermore be adapted for bit sampling the incoming bit stream at optimized sampling time points, such as to provide a sampled output signal. The bit stream processing unit 5 may also be adapted to emit a sample output indicator signal for indicating when an output sample bit is emitted in the sampled output signal, e.g. for controlling the gating of the first clock signal to provide the second clock signal.

The bit stream processing unit 5 may comprise a synchronizer 9, an edge detector 10, an edge validation unit 51 and/or a bit sampling unit 52.

The bit stream processing unit 5 may comprise a synchronizer 9 adapted for synchronizing the incoming bit stream to be in sync with the first clock signal and for generating a bus synchronization signal. The synchronizer may implement standard synchronization technologies as known in the art. For example, the synchronizer may be adapted for compensating for a physical delay time between a transmitter on the electronic communication bus system 20 where an incoming bit stream originates and the receiver circuit. For example, the synchronizer may be adapted for compensating for variations in the first clock signal, e.g. due to temperature or voltage fluctuations, and/or variations in the transmission baud rate of the incoming signal.

Figure 6:
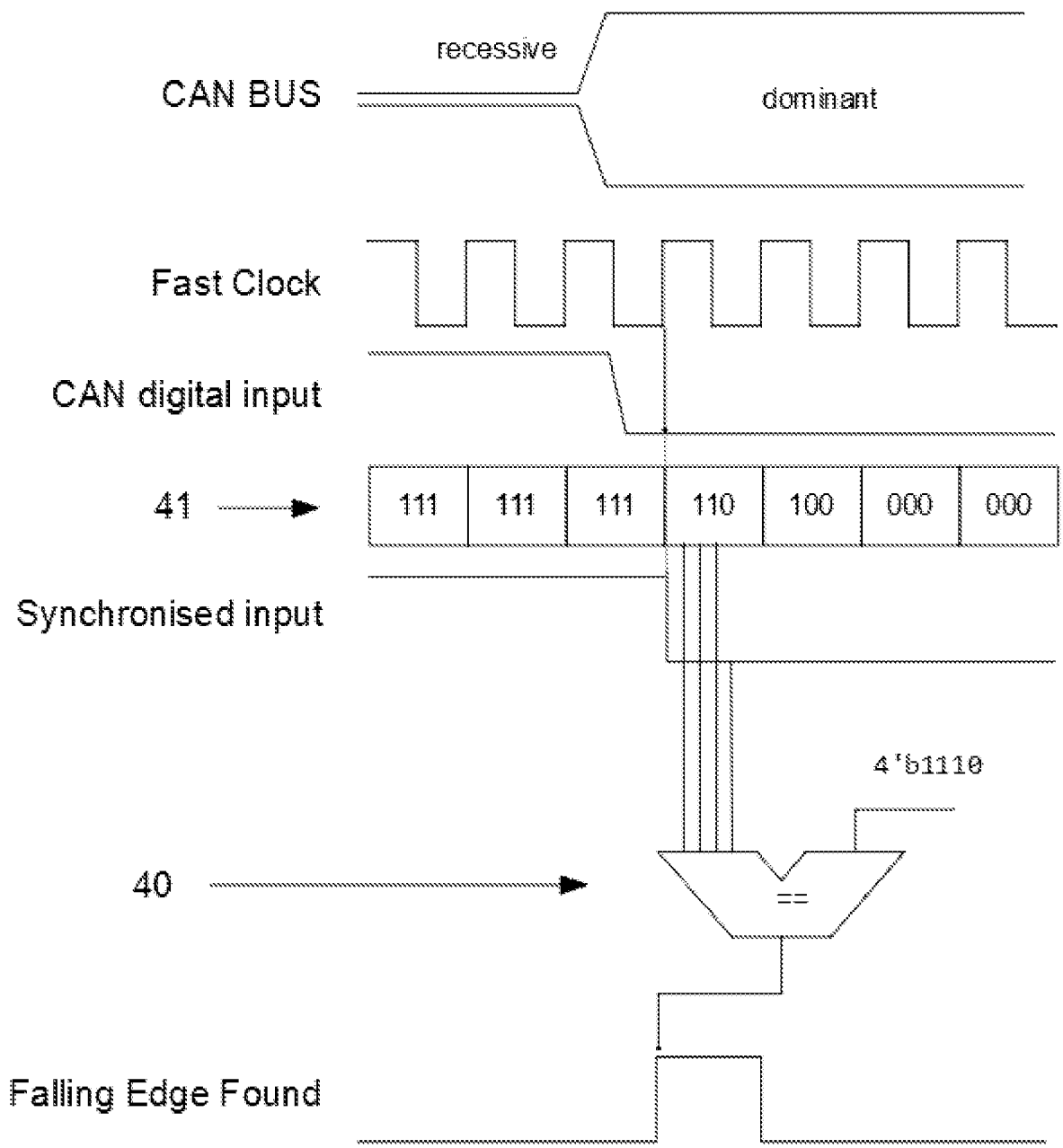
FIG. 6 shows an exemplary approach to detecting a falling edge pattern, relating to embodiments of the present invention.

The bit stream processing unit may comprise an edge detector 10 for detecting a falling edge pattern in the synchronized bit stream and for generating a detected falling edge signal. FIG. 6 shows an exemplary approach to detecting the falling edge pattern, as is described in further detail hereinbelow. For example, instead of symmetrically detecting rising and falling edges to generate a bit stream out of incoming data, only falling edges may be detected, in some embodiments according to the present invention. It is an advantage that the falling edges, e.g. in which the signal changes from recessive to dominant, may have a steeper slope with respect to time than rising edges, e.g. in which the signal changes from dominant to recessive.

The bit stream processing unit 5 may furthermore comprise an edge validation unit 51, e.g. to advantageously improve robustness and noise resistance of the falling edge recognition. The edge validation unit 51 may be adapted for ensuring the stability of the signal in a time frame following a detected falling edge, e.g. by sampling at predetermined moments in time after the detected edge in which the incoming data stream is assumed to remain at a stable level.

The receiver circuit comprises a frame decoding unit 6 for decoding a data frame encoded in the digital input data stream in accordance with a Controller Area Network protocol.

The frame processing unit 15 comprises a flexible data rate detector 62 for detecting a flexible data rate frame, i.e. a CAN FD-frame, in the digital input data stream, e.g. in the sampled output signal, and a recessive bit counter 61 for counting recessive bits in the digital input data stream, e.g. in the sampled output signal, after detecting the flexible data rate frame.

For example, in the context of a CAN protocol, if a given bit is set, i.e carries a logic 1 information, the bit is considered as being recessive, while, if a given bit is not set, thus the bit carries a logic 0 information, the bit is considered as being dominant.

The selection criterion of the switch is controlled by the frame processing unit 15 to be satisfied when the flexible data rate frame is detected and to be reset to an unsatisfied condition when the recessive bit counter 61 reaches a predetermined number.

According to the standard ISO11898-7, CAN FD Frames start with an arbitration bitrate, as defined in the CAN specification standard, which can be analyzed while relying on a low-power and/or low-accuracy oscillator 19 as clock source.

Figure 3:
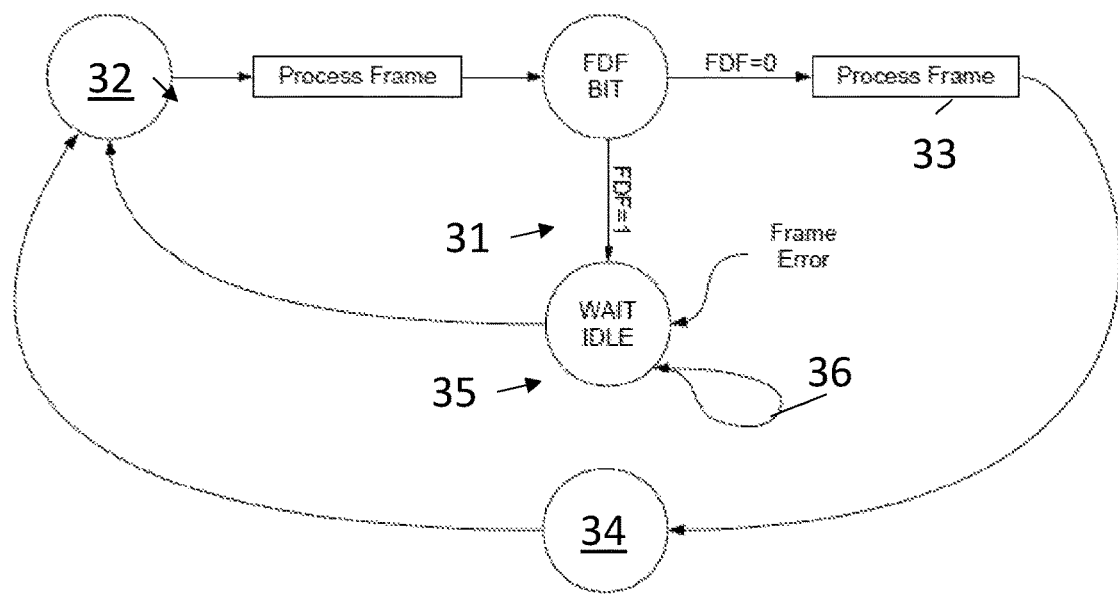
FIG. 3 illustrates a state machine which can be implemented in a receiver circuit in accordance with embodiments of the present invention.

Referring to FIG. 3, an exemplary state machine that may be implemented by the frame processing unit 15 is shown. While reference is made to the frame processing unit 15, this may refer to processing by the frame processing unit 15, but also (e.g. in part) to processing by the frame decoding unit 6. Furthermore, this processing may also impact the mode of Bit Stream Processing implemented in a bit stream processing unit 5. However, it is noted that a partitioning of the receiver circuit in discrete components based on their function is, to some extent, arbitrary. For example, the frame decoding unit 6, the bit stream processing unit 5 and/or the wake-up decision unit 7 may be, physically, clearly distinct components or may be intricately co-integrated. Furthermore, for the purpose of the present invention, relevant parts of the bit stream processing unit 5 and/or the frame decoding unit 6 and/or the wake-up decision unit 7 may alternatively be considered as parts of the unit designated as "frame processing unit" 15, where appropriate.

The flexible data rate detector 62 may be adapted for detecting a Flexible Data Rate Format (FDF) bit, as illustrated by the flow step 31. The flexible data rate detector may be adapted for sending a control signal to the switch 12 upon detecting a logic 1 value of the FDF bit, such as to activate the analog filter 11, e.g. to incorporate the analog filter path in the receiver chain starting from the detection of the FD frame. After detection of the flexible data rate frame, e.g. after detecting an FDF Bit=1 value, the filtered receiver (RX) path is used, e.g. from detecting the FDF bit for the FD-Frame until a BUS Idle condition is detected.

Thus, the receiver circuit 24 may be adapted for performing a bit stream analysis of control fields of the incoming CAN Frame to detect the flexible data rate frame, e.g. the FDF and/or Bit Rate Switch (BRS) bits.

Figure 5:
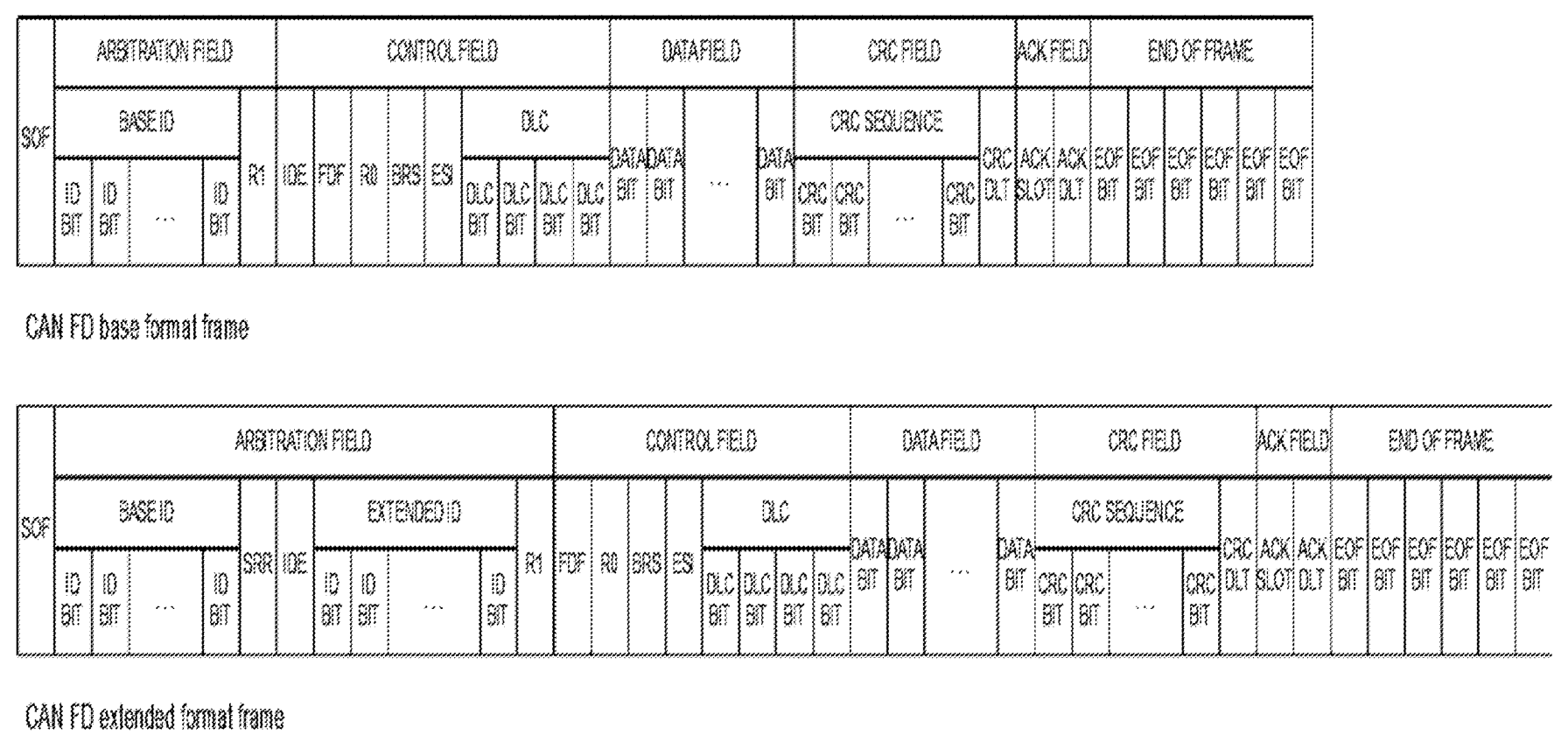

Referring to FIG. 5, the flexible data rate detector may detect the frame type detection from the Control field of the incoming CAN-Frame, e.g. using the FDF and/or Bit Rate Switch (BRS) bits. In a CAN FD network, the data transmission phase can be carried out at a higher bit rate. The switch to the higher bit rate is indicated by the BRS Bit information.

Thus, the received data of the data field and the CRC fields of an FD Frame, as illustrated in FIG. 5, can be masked in a masking window. By activating the filtered receiver path, an End of Frame can be detected such as to properly start processing a consecutive frame, e.g. by deactivating the analog filter 11, and short dominant bit glitches are filtered out while waiting for the End of Frame state. Such short dominant bit glitches could otherwise cause the masking window to be closed too early, or too late, by erroneously detecting the End of Frame.

FIG. 5 illustrates the CAN base and extended format frame compositions according the standard ISO11898-7. In the frame formats illustrated in FIG. 5, SOF refers to a Start Of Frame, ID refers to Identifier bits, R0 and R1 refer to Reserved Bits, IDE refers to an Identifier Extension bit, FDF refers to a Flexible Data Rate Format bit, BRS refers to a Bit Rate Switch, ESI refers to an Error State Indicator, DLC refers to Data Length Code bits, CRC refers to Cyclic Redundancy Check bits, ACK SLOT refers to an Acknowledgement Slot bit, ACK DLT refers to an Acknowledgement Delimiter bit, EOF refers to an End Of Frame sequence and SRR refers to a Substitute Remote Request.

The frame processing unit 15 may be adapted for waiting for a Start of Frame (SOF), as shown by the state 32 in FIG. 3.

After detection of an SOF, the frame may be processed. If the FDF bit is not set, the frame processing unit 15 may detect the presence of a normal frame, i.e. a non-FD frame, and the frame may be processed 33 in a conventional manner as known in the art. For example, the receiver circuit 24, e.g. the wake-up decision unit 7, may implement a method for detecting a wake-up condition encoded in a normal frame, as known in the art, while the device is in a power-preservation mode, e.g. using a low-power and/or low-precision oscillator 19 as clock source. The conventional processing 33 of a normal frame may continue until detecting 34 the Acknowledge field and the End of Frame field.

For example, the receiver circuit may comprise a wake-up decision unit 7 for processing the data frame when, e.g. if and only if, the FDF bit is set to a logic 0 value such as to detect a selective wake-up message encoded in the data frame while the receiver circuit is in a power-preservation mode.

An FD frame is partially transmitted at a higher bit rate. For example, it may be disadvantageous to process such higher bit rate information when the device is in a power-preservation mode. For example, in a power-preservation mode, the device may use a low-power and/or low-accuracy oscillator. The high bit rate information transmitted in the FD frame may, particularly, not be processed using such low-power and/or low-accuracy oscillator. For example, the transmitted information at high bit rate may be, due to sampling ratio, not accessible to the receiver and is therefore treated as arbitrary. Thus, when a high bit rate is applied, for example as indicated by the FDF=1 condition, the remainder of the frame can be ignored by the receiver, except for the detection of the end of frame, as explained hereinbelow.

For an FD frame, the length of the data field, i.e. the payload, cannot be calculated from control field information, since the data length code (DLC) is transmitted at high bit rate. Therefore, in accordance with embodiments of the present invention, the data transmitted at a high bit rate in an FD frame can be masked out. For example, the wake-up decision unit 7 may be adapted for processing the digital input data stream, e.g. the sampled output signal, to detect a Wake Up Frame when the flexible data rate condition is not detected, but to prevent such processing when the flexible data rate condition is detected. Thus, information transmitted at a high bit rate cannot erroneously be interpreted as a Wake Up Frame, e.g. such that the receiver circuit (e.g. the transceiver) can stay in a low power consumption state.

The frame processing unit 15 may implement a digital filtering by waiting 35 for the recessive bit counter overflow. Particularly, the recessive bit counter 61 is adapted for counting recessive bits in the digital input data stream, e.g.

in the sampled output signal, after detecting the flexible data rate frame and for resetting the selection criterion to an unsatisfied condition when the recessive bit counter reaches a predetermined number. The predetermined number may correspond to the detection of a BUS-IDLE state of six consecutive recessive bits. Such sequence of recessive bits, e.g. six recessive bits, may then be considered as an End of Frame (EOF). The recessive bit counter may be adapted for counting 36 to six recessive bits in a row.

The receiver circuit 24 may comprise an edge detector 10, an edge validation unit 51 and a bit sampling unit 52, e.g. the receiver circuit 24 may comprise a bit stream processing unit 5 comprising the edge detector 10, the edge validation unit 51 and the bit sampling unit 52. The recessive bit counter 61 may receive an edge signal from the edge detector 10 and/or the edge validation unit 51.

The recessive bit counter 61 may be adapted for resetting the count, e.g. to zero, when detecting a falling edge, i.e. a recessive to dominant edges, for example such edge as asserted by the edge detector 10. The edge detector 10 may, advantageously, also be used for synchronization during the data field processing of a normal (i.e. non-FD) CAN message. The edge assertion may be performed by a pattern match, as illustrated in FIG. 6.

The edge detector 10 may comprise a shift register 40 for storing data samples of the incoming bit stream and a comparator 41 for detecting a falling edge by comparison of at least two values stored in the shift register 40 and the bus synchronization signal provided by a synchronizer 9 to a predetermined falling edge pattern such as to generate the detected falling edge signal.

In a second aspect, the present invention relates to an integrated circuit device for transmitting and/or receiving data through an electronic communication bus system. Referring, for example, to FIG. 4, an integrated circuit device 1 for transmitting and/or receiving data through an electronic communication bus system 20 is shown. The device comprising a transceiver 2 that comprises a bus system connector 21 for interfacing with the electronic communication bus system 20 and a receiver circuit 24, in accordance with embodiments of the present invention, for processing incoming data obtained from the electronic communication bus system via the bus system connector 21.

The integrated circuit device 1 may be a Controller Area Network node for transmitting and/or receiving data through the electronic communication bus system 20 in the form of a Controller Area Network bus system.

The integrated circuit device 1 may be adapted for supporting selective wake-up and/or partial networking of the Controller Area Network bus system, e.g. adapted for supporting CAN network selective wake up according to an ISO/DIS 11898-6 standard.

The device 1 comprises a transceiver 2 that comprises a bus system connector 21 for interfacing with the electronic communication bus system 20, e.g. adapted for operably connecting to a pair of signal carrying conductors CANL, CANH of a CAN bus system. The transceiver may comprise to a circuit adapted for transmitting data to the electronic communication bus system 20 and for receiving data from the electronic communication bus system 20. The bus system connector 21 may, for example, comprise an analog front-end bus interface, e.g. as shown in FIG. 2, for converting an analog signal received from the electronic communication bus system 20 to a digital format, e.g. as known in the art.

The transceiver 2 comprises the receiver circuit 24 for processing incoming data obtained from the electronic communication bus system, e.g. via the bus system connector 21, in a processing chain forming a receive path.

The transceiver may also comprise a transmitter circuit 23 for processing outgoing data to be provided to the electronic communication bus system, e.g. via the bus system connector 21, in a processing chain forming a transmit path. The transmitter circuit 23 may be a transmitter circuit, as known in the art, suitable for generating, e.g. based on a digital input signal, an output signal suitable to be transmitted over the electronic communication bus system in accordance with a predetermined communication bus system specification, e.g. in accordance with a Controller Area Network specification.

The receiver circuit 24 and the transmitter circuit 23 may refer to features of a functional topology, and not necessarily to entirely separate physical components of the transceiver, e.g. the receiver circuit and the transmitter circuit may share at least one circuit element, e.g. a support component 17 and/or a clock signal generator 19, but embodiments are also not necessarily limited to any shared usage of components in the receive path and the transmit path.

The transceiver 2 may comprise at least one support component 17, such as a component for monitoring of a function of the transceiver, a component for regulating a power supply, and/or similar support circuits as known in the art.

In a third aspect, the present invention relates to a method for processing an incoming bit stream, encoded in an analog signal received from an electronic communication bus system.

The method comprises converting the analog signal to a digital input data stream, in which the analog signal is filtered, using an analog filter, before generating the digital input data stream if, and only if, a selection criterion is met.

The step of filtering the analog signal may comprise using the analog filter in the form of a low-pass filter for filtering out frequencies in the analog signal that correspond to a time period shorter than a value in the range of 5% to 17.5% of the length of the nominal bit time of the incoming bitstream.

The method may comprise processing the digital input data stream by bit stream synchronization and bit sampling of the digital input data stream to provide a sampled output signal.

The method comprises at least partially decoding a data frame encoded in the digital input stream in accordance with a Controller Area Network protocol to detect a flexible data rate frame in the digital input data stream.

The step of at least partially decoding the data frame may comprise at least partially decoding the data frame in the sampled output signal.

Referring to FIG. 3, the method may comprise waiting 32 for a Start of Frame (SOF). After detection of an SOF, the frame may be processed further, e.g. by at least partially decoding the data frame.

In a method in accordance with embodiments of the present invention, the step of at least partially decoding the data frame may comprise detecting the flexible data rate frame by detecting a Flexible Data Rate Format, FDF, bit.

The method comprises counting a number of consecutive recessive bits in the digital input data stream after detecting the flexible data rate frame. For example, recessive bits in the digital input data stream, e.g. in the sampled output signal, may be counted after detecting the flexible data rate frame, e.g. after detecting an FDF=1 condition.

The method may also comprise detecting and/or validating a falling edge, i.e. a recessive to dominant edge, in the digital input data stream, and resetting the recessive bit count, e.g. to zero, when the falling edge is detected and/or validated. The edge assertion may be performed by a pattern match, as illustrated in FIG. 6.

The method comprises controlling the selection criterion to be satisfied when the flexible data rate frame is detected and to be reset to an unsatisfied condition when the recessive bit count reaches a predetermined number.

The step of controlling may comprise activating the analog filter upon detecting the FDF bit having a logic 1 value.

The method may comprise waiting 35 for a recessive bit count overflow. Particularly, the selection criterion may be reset to an unsatisfied condition when the recessive bit count reaches a predetermined number.

The predetermined number may be equal to six. The predetermined number may correspond to the detection of a BUS-IDLE state of six consecutive recessive bits. Such sequence of recessive bits, e.g. six recessive bits, may then be considered as an End of Frame (EOF). The recessive bit counter may be adapted for counting 36 to six recessive bits in a row.

The method may also comprise processing the data frame when, e.g. if and only if, the FDF bit is set to a logic 0 value such as to detect a selective wake-up message encoded in the data frame while the receiver circuit is in a power-preservation mode. If the FDF bit is not set, the frame may be processed 33, e.g. in a conventional manner as known in the art. For example, a wake-up condition encoded in a normal frame (i.e. non-FD frame), as known in the art, may be detected while in a power-preservation mode, e.g. using a low-power and/or low-precision oscillator as clock source. The conventional processing 33 of a normal frame may continue until detecting 34 the Acknowledge field and the End of Frame field.

The method may comprise providing a timing signal, e.g. a clock signal, obtained from a low-cost and/or low-accuracy oscillator, such as an RC oscillator, and using the timing signal for the step of processing the digital input data stream and/or the step of at least partially decoding the data frame.

The invention claimed is:

1. A receiver circuit for receiving an analog signal, encoding an incoming bit stream, from a Controller Area Network bus system and for processing said incoming bit stream, the receiver circuit comprising:
    an analog interface for converting said analog signal to a digital input data stream, said analog interface comprising an analog filter and a switch to process said analog signal before generating said digital input data stream using said filter if, and only if, a selection criterion controlling said switch is met,
    a frame decoding partition for at least partially decoding a data frame encoded in said digital input data stream in accordance with a Controller Area Network protocol, and
    a frame processing partition comprising a flexible data rate detector for detecting a flexible data rate frame in said digital input data stream by detecting a Flexible Data Rate Format, FDF, bit, said flexible data rate detector being adapted for activating said analog filter by said switch upon detecting said FDF bit having a logic 1 value and a recessive bit counter for counting a number of consecutive recessive bits in said digital input data stream after detecting said flexible data rate frame,
    a wake-up decision partition for processing said data frame when said FDF bit is set to a logic 0 value such as to detect a selective wake-up message encoded in said data frame while the receiver circuit is in a power-preservation mode,
    wherein said frame processing partition is adapted for controlling said selection criterion, such that said selection criterion is satisfied when the flexible data rate frame is detected and is reset to an unsatisfied condition when the recessive bit counter reaches a predetermined number.

2. The receiver circuit as in claim 1, wherein said predetermined number is six, corresponding to the detection of a BUS-IDLE state of six consecutive recessive bits.

3. The receiver circuit as in claim 1, comprising an edge detector and/or an edge validation unit, wherein said recessive bit counter receives an edge signal from said edge detector and/or said edge validation unit and is adapted for resetting its count when said edge signal indicates a falling edge.

4. The receiver circuit as in claim 1, wherein said analog filter is a low-pass filter for filtering out frequencies in the analog signal that correspond to a time period shorter than a value in a range of 5% to 17.5% of a length of a nominal bit time of the incoming bit stream.

5. The receiver circuit as in claim 1, comprising a bit stream processing partition for bit stream synchronization and bit sampling of said digital input data stream to provide a sampled output signal, wherein said frame decoding partition is adapted for decoding a data frame in said sampled output signal.

6. The receiver circuit as in claim 5, comprising a resistance-capacitance (RC) oscillator for providing a timing signal to said bit stream processing partition and/or said frame decoding partition.

7. An integrated circuit device for transmitting and/or receiving data through a Controller Area Network bus system, the device comprising a transceiver, wherein said transceiver comprises a bus system connector for interfacing with the Controller Area Network bus system and a receiver circuit in accordance with any of the previous claims for processing incoming data obtained from the Controller Area Network bus system via the bus system connector.

8. The integrated circuit device as in claim 7, wherein said integrated circuit device is adapted for supporting selective wake-up and/or partial networking of the Controller Area Network bus system.

9. A method for processing an incoming bit stream by a receiver circuit, said incoming bit stream encoded in an analog signal received from a Controller Area Network bus system, the method comprising:
    converting said analog signal to a digital input data stream, wherein said analog signal is filtered, using an analog filter, before generating said digital input data stream if, and only if, a selection criterion is met;
    at least partially decoding a data frame encoded in said digital input data stream in accordance with a Controller Area Network protocol to detect a flexible data rate frame in said digital input data stream by detecting a Flexible Data Rate Format, FDF, bit and activating said analog filter upon detecting said FDF bit having a logic 1 value;
    counting a number of consecutive recessive bits in said digital input data stream after detecting said flexible data rate frame,
    processing said data frame when said FDF bit is set to a logic 0 value such as to detect a selective wake-up message encoded in said data frame while the receiver circuit is in a power-preservation mode and controlling said selection criterion to be satisfied when the flexible data rate frame is detected and to be reset to an unsatisfied condition when said recessive bit count reaches a predetermined number.

10. The method as in claim 9, wherein said predetermined number is six, corresponding to the detection of a BUS-IDLE state of six consecutive recessive bits.

* * * * *